US009643513B2

(12) United States Patent
Gao et al.

(10) Patent No.: US 9,643,513 B2
(45) Date of Patent: May 9, 2017

(54) PROPELLING SYSTEM AND ENERGY MANAGEMENT SYSTEM AND METHODS

(71) Applicant: General Electric Company, Schenectady, NY (US)

(72) Inventors: Jinping Gao, Shanghai (CN); Hai Qiu, Shanghai (CN); Tong Zhao, Shanghai (CN); Fei Xu, Shanghai (CN); Hongwu She, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/962,332

(22) Filed: Dec. 8, 2015

(65) Prior Publication Data

US 2016/0159244 A1    Jun. 9, 2016

(30) Foreign Application Priority Data

Dec. 8, 2014  (CN) .......................... 2014 1 0747549

(51) Int. Cl.
*B60L 11/18* (2006.01)
*B60L 11/00* (2006.01)
*B60L 7/16* (2006.01)

(52) U.S. Cl.
CPC ............ *B60L 11/1868* (2013.01); *B60L 7/16* (2013.01); *B60L 11/005* (2013.01); *B60L 2240/423* (2013.01); *B60L 2240/547* (2013.01); *Y02T 10/642* (2013.01); *Y02T 10/7005* (2013.01); *Y02T 10/7022* (2013.01); *Y02T 10/7066* (2013.01)

(58) Field of Classification Search
CPC .............. B60L 15/2045; B60L 3/0084; G05B 2219/2637
See application file for complete search history.

(56) References Cited

U.S. PATENT DOCUMENTS

| 5,013,548 A | 5/1991 | Haynes et al. |
| 5,026,638 A | 6/1991 | Saperstein |
| 5,331,365 A | 7/1994 | Miyazawa et al. |
| 5,341,280 A | 8/1994 | Divan et al. |

(Continued)

FOREIGN PATENT DOCUMENTS

| CN | 102139695 A | 8/2011 |
| CN | 103312020 A | 9/2013 |

OTHER PUBLICATIONS

Rosario, "Power and Energy Management of Multiple Energy Storage Systems in Electric Vehicles", Department of Aerospace Power and Sensors, Cranifield University, pp. 1-276, 2008.

(Continued)

*Primary Examiner* — Karen Masih
(74) *Attorney, Agent, or Firm* — Meagher Emanuel Laks Goldberg & Liao, LLP

(57) ABSTRACT

An energy management system comprises a first electricity transformer with one or more first leg circuit(s), a second electricity transformer with one or more second leg circuit(s), and a control device. One or more first leg circuit(s) is (are) coupled to an energy-type supply, and one or more second leg circuit(s) is (are) coupled to a power-type supply. The control device will control the first and second electricity transformers operating under at least one of two conditions when a traction device is under driving mode.

19 Claims, 6 Drawing Sheets

(56) References Cited

U.S. PATENT DOCUMENTS

| | | |
|---|---|---|
| 5,373,195 A | 12/1994 | De Doncker et al. |
| 5,710,699 A | 1/1998 | King et al. |
| 5,903,449 A | 5/1999 | Garrigan et al. |
| 7,489,093 B2 | 2/2009 | King et al. |
| 7,595,597 B2 | 9/2009 | King et al. |
| 7,866,425 B2 | 1/2011 | King et al. |
| 7,932,633 B2 | 4/2011 | King et al. |
| 8,030,884 B2 | 10/2011 | King et al. |
| 8,080,973 B2 | 12/2011 | King et al. |
| 8,120,290 B2 | 2/2012 | King |
| 8,138,720 B2 | 3/2012 | Snyder et al. |
| 8,154,149 B2 | 4/2012 | King |
| 8,188,720 B2 | 5/2012 | Kim et al. |
| 8,274,173 B2 | 9/2012 | King et al. |
| 8,292,009 B2 | 10/2012 | Yamada et al. |
| 8,310,083 B2 | 11/2012 | Huber et al. |
| 8,378,623 B2 | 2/2013 | Kusch et al. |
| 8,486,570 B2 | 7/2013 | King et al. |
| 8,698,451 B2 | 4/2014 | King et al. |
| 8,761,978 B2 | 6/2014 | King |
| 8,829,719 B2 | 9/2014 | Berry et al. |
| 8,829,722 B2 | 9/2014 | Kusch et al. |
| 8,916,993 B2 | 12/2014 | Berry et al. |
| 8,928,259 B2 | 1/2015 | Kanakasabai et al. |
| 8,963,365 B2 | 2/2015 | King et al. |
| 8,981,727 B2 | 3/2015 | Kusch et al. |
| 8,994,327 B2 | 3/2015 | Kusch et al. |
| 9,000,614 B2 | 4/2015 | King et al. |
| 9,013,168 B2 | 4/2015 | King et al. |
| 9,073,438 B2 | 7/2015 | Gemin et al. |
| 9,120,390 B2 | 9/2015 | King et al. |
| 9,290,097 B2 | 3/2016 | Steigerwald et al. |
| 9,290,107 B2 | 3/2016 | Shi et al. |
| 2006/0152085 A1 | 7/2006 | Flett et al. |
| 2006/0250902 A1 | 11/2006 | Bender et al. |
| 2009/0314558 A1 | 12/2009 | Ang et al. |
| 2010/0089547 A1 | 4/2010 | King et al. |
| 2011/0041723 A1* | 2/2011 | Kumar ............... B60L 9/16 105/35 |
| 2014/0152225 A1 | 6/2014 | Zhou et al. |
| 2014/0265942 A1 | 9/2014 | Li et al. |
| 2017/0001528 A1* | 1/2017 | King et al. ......... B60L 7/12 |

OTHER PUBLICATIONS

Carter et al., "Strategies for Control of a Battery/ Supercapacitor System in an Electric Vehicle", International Symposium on Power Electronics, Electrical Drives, Automation and Motion, Ischia, pp. 727-732, Jun. 11-13, 2008.

Porras, "Analysis of Predictive Energy Management Strategies for Electric Vehicles", Master Thesis, Automatic Control Laboratory, pp. 1-66, 2011.

Carter et al., "Optimizing for Efficiency or Battery Life in a Battery/ Supercapacitor Electric Vehicle", IEEE Transactions on Vehicular Technology, vol. No. 61, Issue No. 4, pp. 1526-1533, May 2012.

* cited by examiner

PROPELLING SYSTEM AND ENERGY MANAGEMENT SYSTEM AND METHODS

BACKGROUND OF THE INVENTION

Field of the Invention

Embodiments of the present invention relate to a propelling system, especially the propelling system, energy management system that comprises an energy-type supply and power-type supply to provide power for vehicles and their respective methods.

Energy-type supply (like battery) and power-type supply (like supercapacitor) are usually employed in electric vehicles or hybrid electric vehicle to provide power for the traction device and are able to capture renewable energy. When vehicles are under driving mode (for example when accelerating), the energy-type supply is incapable of providing large power instantly, while the power-type supply can achieve this to satisfy the demand for instant large power. When vehicles are under regenerative braking mode (for example when slowing down), energy-type supply is unable to absorb energy fast, besides, it also leads to inefficiency due to large internal resistance; while the power-type supply can absorb energy fast and is of high efficiency.

Energy-type supply and power-type supply are connected to traction device through one or more DC/DC transformer (s) so as to provide energy for the traction device or receive the renewable energy from the traction device. Currently, energy is distributed between the energy-type supply and power-type supply just on the basis of their respective charging state. The energy-type supply and power-type under this energy management method are of low utilization rate, causing the driving system of vehicles inefficient.

Therefore, it is very necessary to provide a new propelling system and a new energy management system and their respective methods to solve the above problems.

SUMMARY OF THE INVENTION

Here one or more aspects of this invention is (are) summarized for the convenience of understanding; however, this summary is not an extensive overview of the invention; moreover, it's not intended to characterize some of its essential factors or to identify its scope. In the contrast, the main purpose of this summary is to simply present some notions of the invention before get to the detail in the following passage.

On the one hand, embodiments of the invention provides an energy management system that comprises: a first electricity transformer coupled to a traction device, comprising one or more first leg circuit(s) coupled to an energy-type supply; a second electricity transformer coupled to a traction device, comprising one or more second leg circuit(s) coupled to a power-type supply; and a control device for controlling the first and second electricity transformers operating under at least the following conditions when the traction device is under driving mode; when the positive demanded power of traction device is less than or equal to the positive threshold power, part of or all first leg circuits of the first electricity transformer are enabled and all second leg circuits of the second electricity transformer are disabled for the energy-type supply providing power to the traction device; when the positive demanded power is greater than the positive threshold power, part of or all first/second leg circuits of the first/second electricity transformers are enabled respectively for the energy-type and power-type supplies providing power to the traction device.

On the other hand, embodiments of this invention provides an energy management system and method, which is used in the traction device that is coupled to the first and second electricity transformers and this energy management method: provides one or more first leg circuit(s) coupled to energy-type supply to the first electricity transformer; provides one or more second leg circuit(s) coupled to power-type supply to the second electricity transformer; controls the first and second electricity transformers operating under at least following two conditions when the traction device is under driving mode: when the positive demanded power of traction device is less than or equal to the positive threshold power, part of or all first leg circuits of the first electricity transformer are enabled and all second leg circuits of the second electricity transformer are disabled for the energy-type supply providing power to the traction device; when the positive demanded power is greater than the positive threshold power, part of or all first/second leg circuits of the first/second electricity transformers are enabled respectively for the energy-type and power-type supplies providing power to the traction device.

On the other hand, it provides a propelling system that comprises an energy-type supply; a power-type supply; and an electricity transformer coupled to the traction device. This electricity transformer comprises the first leg circuit coupled to the energy-type supply and two second leg circuits that are coupled to power-type supply; and a control device, which is applied to control the electricity transformer operating under at least following three conditions when the traction device is under driving mode; when the positive demanded power is less than or equal to the first threshold power, the first leg circuit is enabled while the two secondary leg circuits are disabled; when the positive demanded power is greater than the first positive threshold power and is less than or equal to the second positive threshold power, the first leg circuit and one of the two second leg circuits are enabled while the other second leg circuit is disabled; when the positive demanded power is less than or equal to the second threshold power, the first leg circuit and the two second leg circuits are enabled.

Due to reasons that part of the first leg circuit and/or part of the second leg circuit can be disabled, the propelling system and method and energy management system and method can satisfy traction device's demand for different power and improve energy utilization rate, reducing vehicles' energy loss and increasing vehicles' travel distance.

BRIEF DESCRIPTION OF THE DRAWINGS

Figures attached with mode of execution may help you better understand embodiments of the invention. Among these figures.

DETAILED DESCRIPTION

Figure 1:
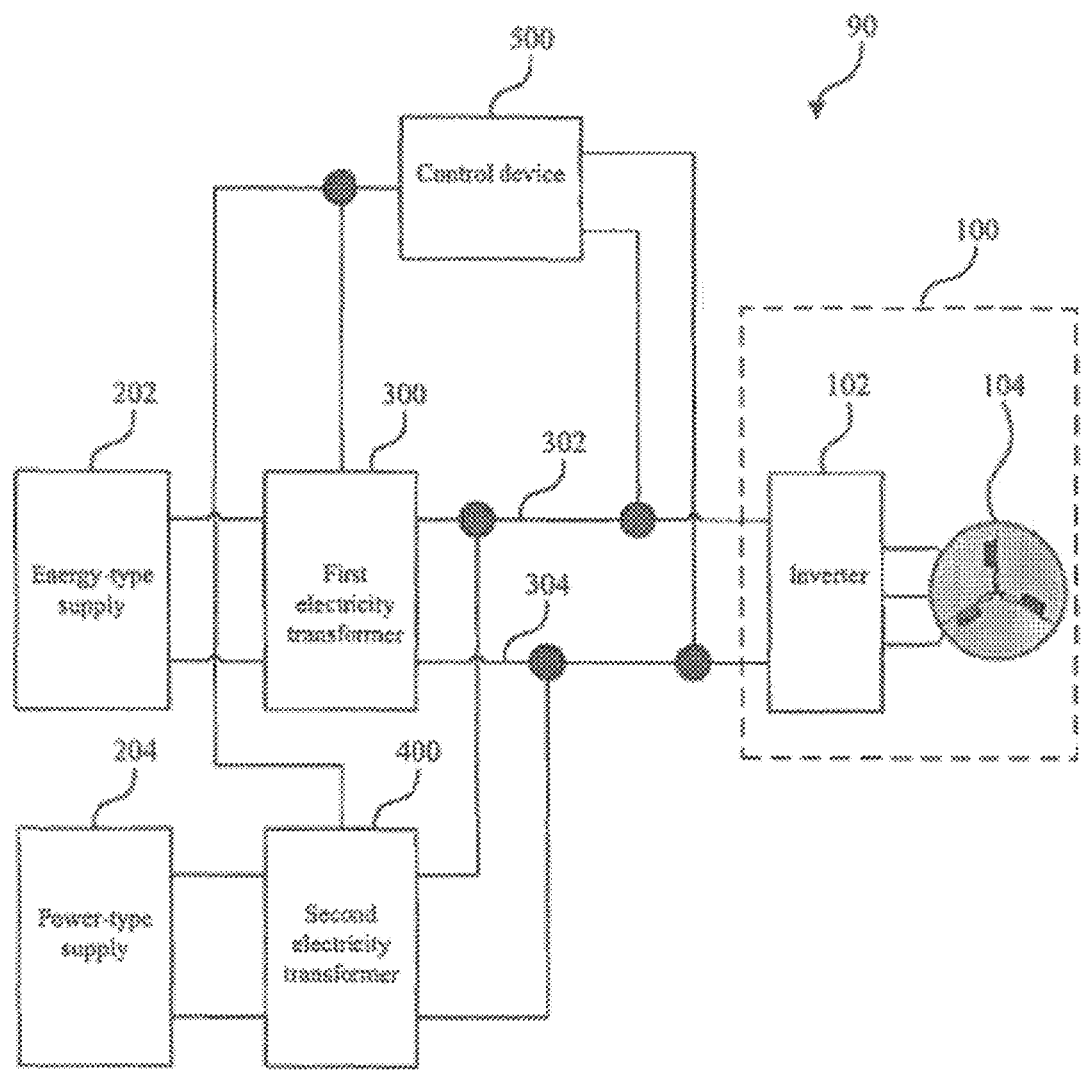
FIG. 1 shows the function modules of a propulsion system of a mode of execution.

Embodiments of the present invention will be shown as follows. It should be noted that all characteristics of actual modes of execution are not described in detail in this Specification for concise purpose. It should be understood that any mode of execution could be changed to another one in actual implementation, just as the process of engineering or design project, various decisions will be made to meet specific target of the developer, or system-related or business-related restrictions. Though the development process may be complex and lengthy, some design, manufacturing or production changes based on the disclosed technologies are usual technical means for common technical personnel in related fields of the disclosed invention contents, and shall not be understood as insufficient disclosure.

Unless otherwise defined, definitions of technical terms or in scientific terms used in the Claim or the Specification shall be understood by those with general skills in fields related to the invention. First", "second" and other similar words used in the Patent Application Specification and the Claim denote no order, quantity or importance, just for classifying different components. "One" and other similar words denote no quantitative restriction, but indicate at least one. "Include" and other similar words denote that element or object before "include" covers element or object and equivalent elements after "include" without excluding other element or object. "Connection" and other similar words are not limited to physical and mechanical connections, but include electrical connections, whether direct or indirect.

Propulsion system 90 includes traction device 100, energy-type supply 202, power-type supply 204, first electricity transformer 300, second electricity transformer 400 and control device 500. Traction device 100 can be excluded from propulsion system 90 in other modes of executions. In this mode, traction device 100, first electricity transformer 300, second electricity transformer 400 and control device 500 constitute an energy management system (unlabeled), which is used to control energy-type supply 202 and power-type supply 204 to provide power to traction device 100, or receive recovered energy from traction device 100 to improve energy utilization efficiency of the propulsion system 90.

Traction device 100 includes inverter 102 and the motor 104, and motor 104, and the inverter 102 is which are coupled in electrical property. In an undefined example, traction device 100 is an AC traction device; inverter 102 is a DC-to-AC inverter, and motor 104 is an AC motor. The DC-to-AC inverter convert direct current into alternating current by connecting a pair of DC bus 302 and 304 to the first electricity transformer 300 and the second electricity transformer 400, and the alternating current is used for the AC motor. The DC bus pair 302 and 304 includes a positive DC bus and a negative DC bus.

In another undefined example, inverter 102 is a DC chopper or PWM providing direct current to DC power to the motor 104 and the motor 104 is a DC motor.

First electricity transformer 300 includes HV and LV sides. Traction device 100 is coupled with HV side of the first electricity transformer 300, and energy-type supply 202 is coupled with LV side of the first electricity transformer 300. In this example, first electricity transformer 300 is a boost converter, which is used to output high voltage in HV side. In other examples, bidirectional buck-boost converter may be used as first electricity transformer 300 to boost voltage.

Similarly, second electricity transformer 400 includes HV and LV sides. Traction device 100 is coupled with HV side of the second electricity transformer 400, and power-type supply 204 is coupled with LV side of the second electricity transformer 400.

Energy-type supply 202 can provide and receive energy. Energy-type supply 202 refers to high proportion or high-energy density energy sources, with unit weight energy density reaching 100 W-hr/kg or higher. Energy-type supply 202 has a large capacity, and is capable of providing high energy. In an undefined example, energy-type supply 202 includes batteries or battery pack, such as fuel cells and lead-acid batteries.

Power-type supply 204 can also provide and receive energy. Power-type supply 204 can provide high current rapidly and receive energy efficiently, so as to meet rapid operation and change. In an undefined example, power-type supply 204 includes super-capacitor. In an example, power-type supply 204 has 63 units connected in series, in which rated voltage in each unit is about 2.7V, and capacitance is above 1000 F.

Control device 500 is coupled with first electricity converter 300 and second electricity converter 400. In several cases, control device 500 is used to control energy-type supply 202 and power -type supply 204 through first electricity converter 300 and second electricity converter 400 based on required power of the traction device 100. These cases will be described in the subsequent FIG. 2-FIG. 6. Control device 500 is coupled with DC bus 302, 304, 302, 304 to receive signal of them, such as voltage and current of DC bus.

Figure 2:
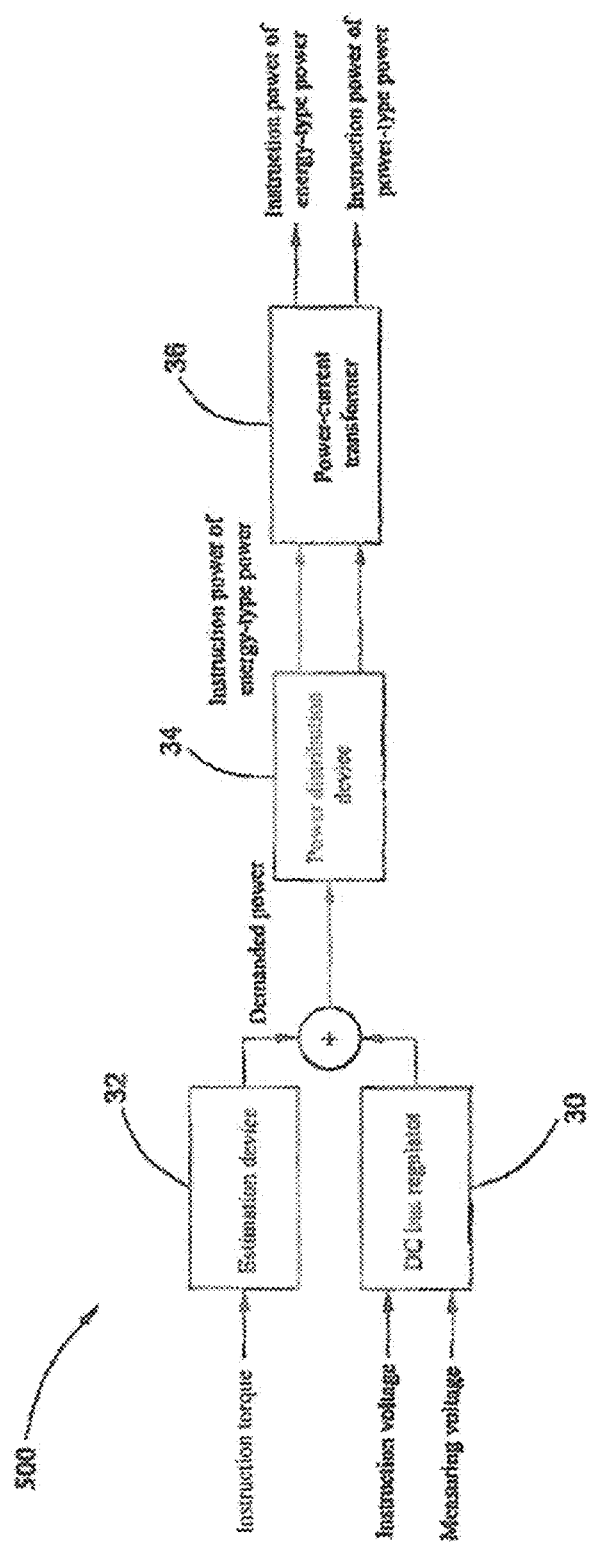
FIG. 2 shows the function modules of a mode of execution of the control device shown in FIG. 1.

FIG. 2 is a schematic diagram of control device 500 of an example. Combined with the reference FIG. 1, control device 500 is used to determine required power of the traction device 100 based on instruction voltage and measured voltage of DC bus 302 and 304. Required power refers to power required for operation of the traction device 100. Required power may be positive or negative in different operation conditions. In an example, instruction voltage of DC bus 302 and 304 can be obtained based on calculation of loss parameters of motor 104 and inverter 102. In another example, instruction voltage can be obtained through experimental measurement. Instruction voltage of DC bus 302 and 304 is set to maximize the efficiency of the traction device 100. Measuring voltage of DC bus 302 and 304 can be obtained through measurement of one or more sensors (not drawn) connected. In an example, control device 500 includes DC bus voltage regulator 30, which is used to determine required power of the traction device 100 based on instruction voltage and measuring voltage of DC bus 302 and 304. DC bus voltage regulator 30 include control loop (not drawn), which can make the measuring voltage equal to the instruction voltage to obtain required power. For example, PID (proportion integration differential) control device.

In the example, control device 500 is further used to estimate load power of traction device 100, and determine required power of traction device 100 based on the estimation results. In the example shown in the figure, control device 500 also include estimation device 32, the motor 104 to which is used to estimate load power based on instruction torque and rotational speed. In an undefined example, instruction torque is input by an input device, such as accelerator pedal and brake. In an undefined example, motor rotational speed is obtained through measurement. Required power can be calculated by adding estimated load power of estimation device 32 and generated power of DC bus voltage regulator 30 to improve response speed of the system.

Control device 500 also include power distribution device 34, which is used to distribute required power between energy-type supply 202 and power-type supply 204 based on different operation conditions, and generate instruction power of energy-type supply 202 and power-type supply 204.

Control device 500 also include power -current converter 36, which is used to transfer instruction power generated by power distribution device 34 to instruction current. Instruction current of energy-type supply 202 is provided to first electricity converter 300, so as to control energy-type supply 202 providing instruction powers to traction device 100. Instruction current of power-type supply 204 is provided to second electricity converter 400, so as to control power-type supply 204 providing instruction power to traction device 100. In the example, sum of instruction power of energy-type supply 202 and power-type supply 204 is equal to required power of traction device 100. In another undefined example, other power sources, such as internal combustion engine, is also used to provide energy to traction device 100.

Figure 3:
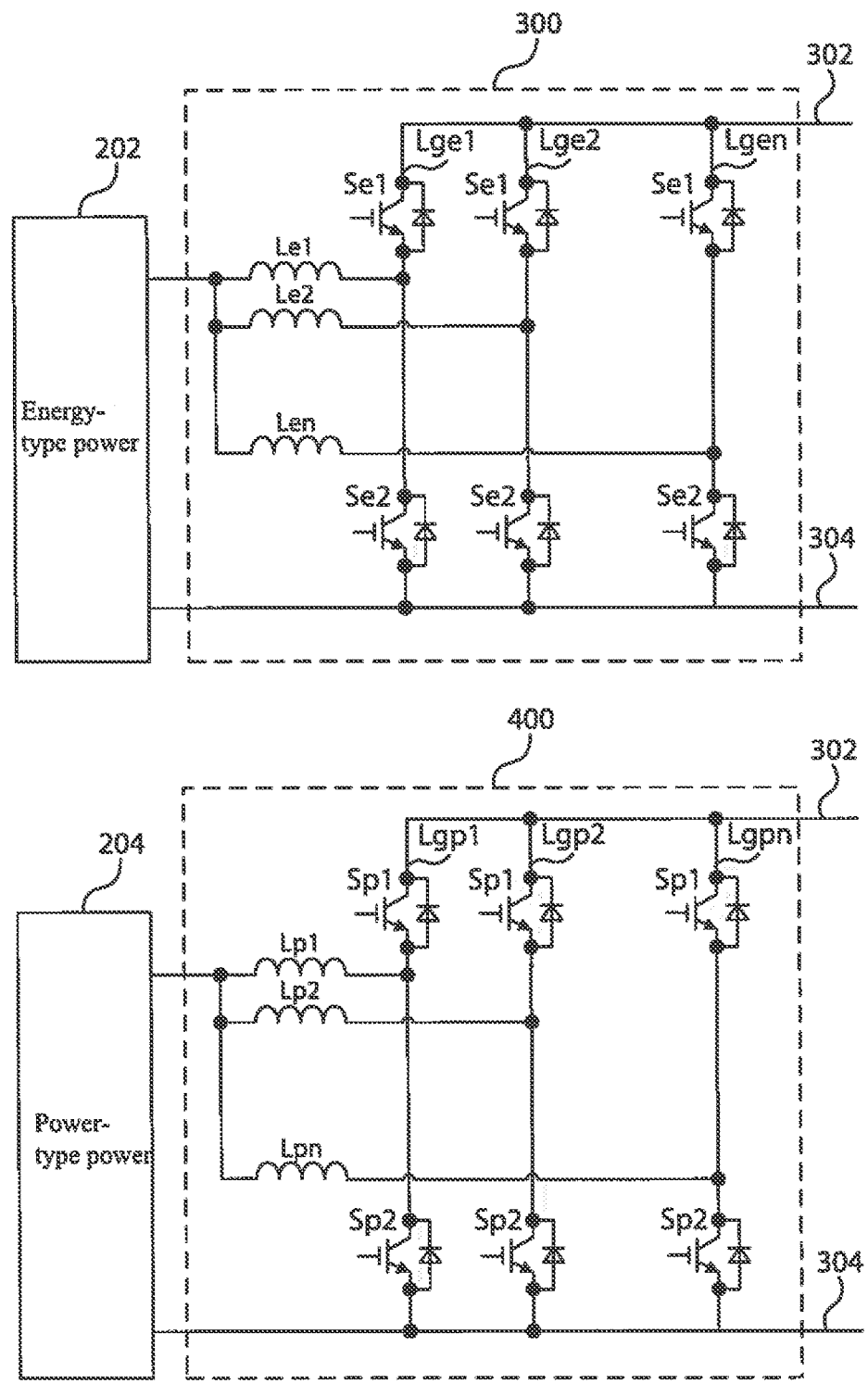
FIG. 3 is a circuit diagram of a mode of execution of the first and second electricity transformers shown in FIG. 1.

See FIG. 3, first electricity transformer 300 includes more first leg circuit(s) Lge1, Lge2, Glen. Each of more first leg circuit(s) Lge1, Lge2, Glen contains two electronic switches Se1, Se2. It is understandable that first electricity transformer 300 includes more first leg circuit(s) in other implementations. And in other examples, each of more first leg circuit(s) Lge1, Lge2, Glen contains at least two electronic switches.

Second electricity transformer 300 includes more second leg circuit(s) Lgp1, Lgp2, Lgpn. Each of more second leg circuit(s) Lgp1, Lgp2, Lgpn contains two electronic switch Sp1, Sp2. It is understandable that first electricity transformer 300 includes more second leg circuit(s) in other implementations. And in other examples, each of more second leg circuit(s) Lgp1, Lgp2, Lgpn contains at least two electronic switch.

When traction device 100 is in driving mode (cruising and accelerating), control device 50 is to control first electricity transformer 300 and second electricity transformer 400 under following at least two conditions;

When positive demanded power of traction 100 is lower than or equal to positive threshold power, part of more first leg circuit(s) Lge1, Lge2, Glen or all the first leg circuit shall be enabled, and part of more second leg circuit(s) Lgp1, Lgp2, Lgpn and all the second leg circuit shall be disabled, so that energy-type supply 202 can provide power for traction device 100; while positive demanded power of traction is greater than positive threshold power, part of first leg circuit Lge1, Lge2, Glen or all the first leg circuit and part of more second leg circuit(s) Lgp1, Lgp2, Lgpn and all the second leg circuit shall be enabled, so that energy-type supply 202 and power-type supply 204 can jointly provide power for traction device 100.

Thereinto, enabled operation is to be realized by the control of instruction current of energy-type supply 202 to first electricity transformer 300. Enabled operation of first leg circuit refers to control normal breakover or shutoff of electronic switch Se1, Se2.

Disabled operation is to be realized by the control of instruction current of power-type supply 204 to second electricity transformer 400. Disabled operation of more second leg circuit(s) Lgp1, Lgp2, Lgpn refers to control the shutoff of electronic switch Se1, Se2 in more second leg circuit(s) Lgp1, Lgp2, Lgpn.

Furthermore, when traction device 500 is in regenerative braking mode (braking to deceleration), control device is to control first electricity transformer 300 and second electricity transformer 400 operates in the traction device 100 is in a regenerative braking mode under the following at least conditions:

When negative requirement power of traction 100 is greater than negative threshold power, part of first leg circuit Lge1, Lge2, Glen or all the first leg circuit shall be enabled, and part of more second leg circuit(s) Lgp1, Lgp2, Lgpn and all the second leg circuit shall be disabled, so that energy-type supply 202 can receive recovered energy from the traction device 100; while negative requirement power of traction is lower than or equal to negative threshold power, part of first leg circuit Lge1, Lge2, Glen or all the first leg circuit and part of more second leg circuit(s) Lgp1, Lgp2, Lgpn and all the second leg circuit shall be enabled, so that energy-type supply 202 and power-type supply 204 can jointly receive recovered energy from the traction device 100. That is to say, energy-type supply 202 and (or) power type supply 204 shall be charged by receiving recovered energy from traction device 100. Electric machine 104 serves as the electric generator.

Furthermore, more inductor Le1, Le2, Len contained in propulsion system 90 are respectively coupled between energy-type supply 202 and more first leg circuit(s) Lge1, Lge2, G1en.

More inductor(s) Lp1, Le2, Lpn contained in propulsion system 90 are respectively coupled between energy-type supply 202 and more second leg circuit Lgp1, Lgp2, Lgpn.

Propulsion system 90 of an embodiment of the invention is able to enable or disable part of first leg circuit in the first electricity transformer 300, and enable or disable part of or all the second leg circuit in second electricity transformer 400 of part or all of the second arm circuit. Thus, in case of lower demanded power of traction device 100, part of first leg circuit in the first electricity transformer 300 and (or) part of second leg circuit in the second electricity transformer 400 may just be enabled, which reduces energy loss of first electricity transformer 300 and second electricity transformer 400, and improves energy utilization efficiency of the entire propulsion system 90.

Figure 4:
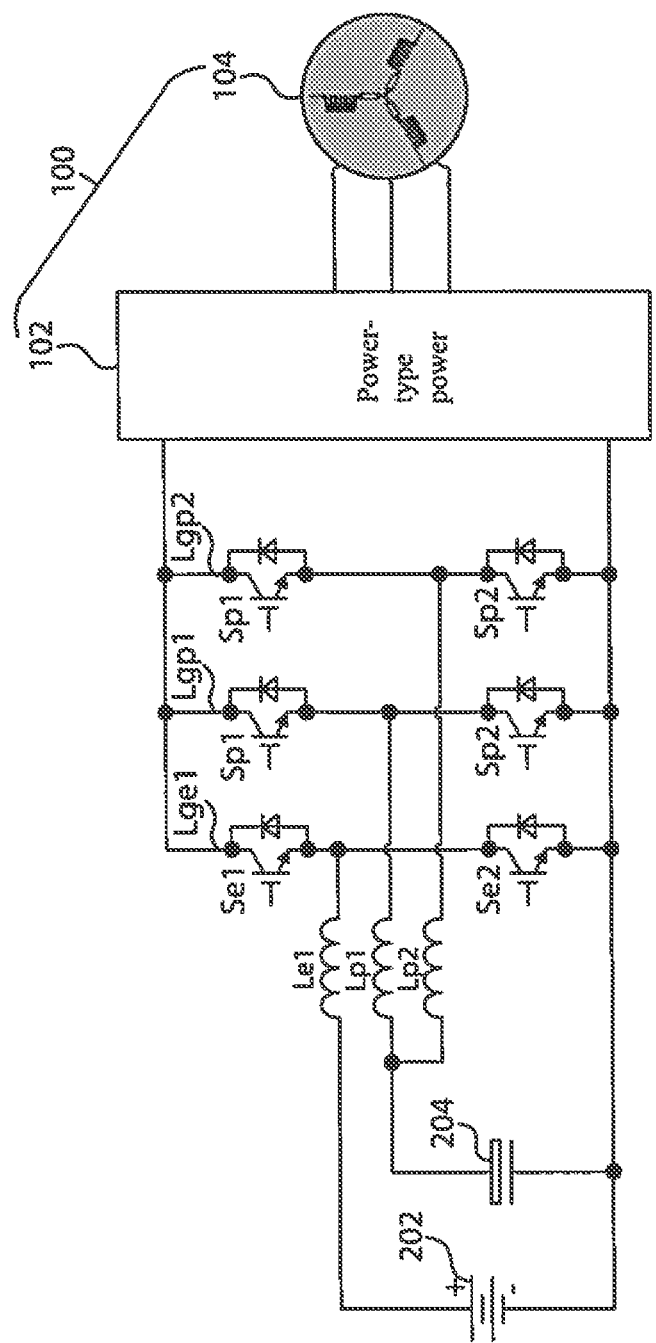
FIG. 4 is a simplified circuit diagram of propulsion system shown in FIG. 1 and FIG. 3.

Specified illustration is as shown in FIG. 4, first electricity transformer 300 includes one first leg circuit Lge1. Second electricity transformer 400 includes two second electricity transformer Lgp1 and Lgp2.

Figure 5:
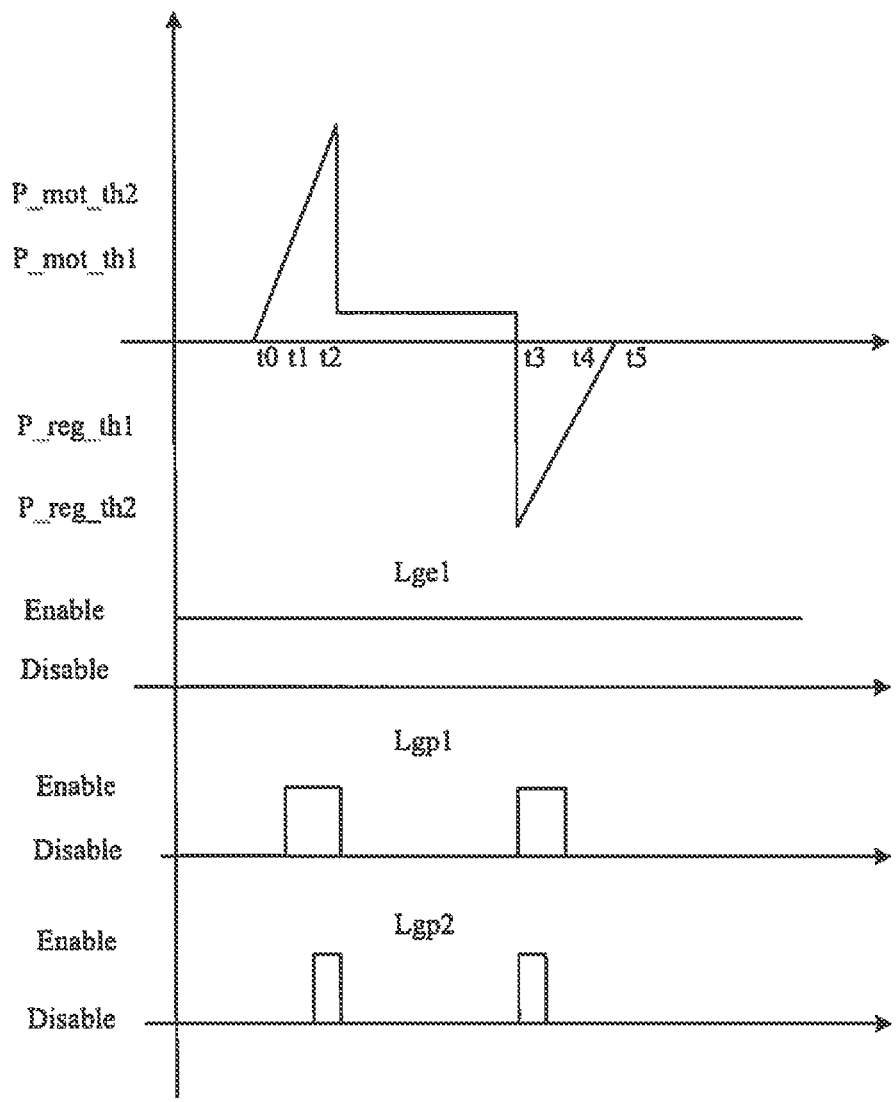
FIG. 5 is an oscillogram presenting relations between required power of traction device and the first and second leg circuits.

See FIG. 5, specifically, above positive threshold power includes first positive threshold power P_mot_th1 and second positive threshold power P_mot_th2.

When positive demanded power is lower than or equal to first threshold power P_mot_th1, that is, positive demanded power of propulsion device 100 is low, control device 500 is to enable first leg circuit Lge1 and disable second leg circuit Lgp1 and Lgp2.

While positive demanded power is greater than first positive threshold power P_mot_th1, and lower than or equal to second positive threshold power P_mot_th2, that is, positive demanded power of propulsion device 100 is medium, control device 500 is to enable first leg circuit Lge1 and second leg circuit, but disable second leg circuit Lgp1 and Lgp2.

And when positive demanded power is greater than or second threshold power P_mot_th2, that is, positive demanded power of propulsion device 100 is high, control device 500 is to enable first leg circuit Lge1 and second leg circuit Lgp1 and Lgp2.

Specifically, above negative threshold power includes first threshold power P_reg_th1 and second threshold power P_reg_th2.

When negative demanded power is greater than to first negative threshold power P_reg_th1, that is, positive demanded power of propulsion device 100 is low, control device 500 is to enable first leg circuit Lge1 and disable second leg circuit Lgp1 and Lgp2.

While negative demanded power is lower than or equal to first negative threshold power P_reg_th1 and greater than second negative threshold power P_reg_th2, negative demanded power of propulsion device 100 is medium, control device 500 is to enable first leg circuit Lge1 and second leg circuit Lgp1, but disable second leg circuit Lgp1 and Lgp2.

And when negative demanded power is lower than or equal to second negative threshold power P_reg_th2, that is, negative demanded power of propulsion device 100 is high, control device 500 is to enable first leg circuit Lge1 and second leg circuit Lgp1 and Lgp2.

Figure 6:
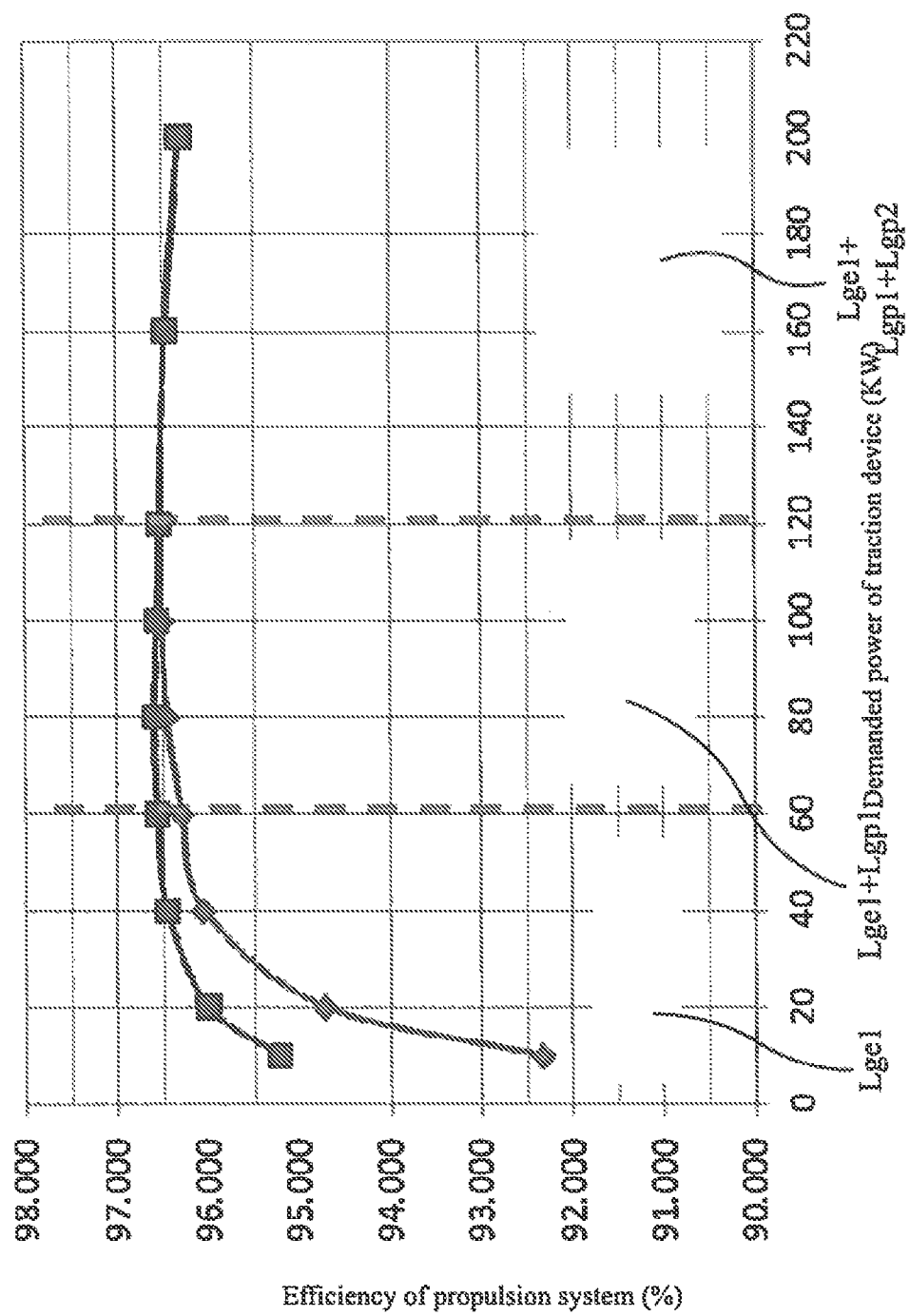
FIG. 6 is a schematic diagram presenting relations between required power of traction device and efficiency of propulsion system.

Based on verification result of FIG. 6 and existing art (prior art or the prior art), when 100 positive demanded power is low, first leg circuit Lge1 and two second leg circuit Lgp1, Lgp2 are enabled, and energy utilization efficiency of propulsion system is among 92%~92.5%, which indicates quite lower energy utilization efficiency.

However, in an embodiment of the invention, when positive demanded power of propulsion system 100 is low, first leg circuit Lge1 is only enabled while second leg circuit Lgp1, Lgp2 are disabled. At this moment, energy utilization efficiency of propulsion system 90 is nearly 95%, which indicates quite higher energy utilization efficiency (i.e. higher than existing art).

Similarly, in existing art, when positive demanded power of propulsion system 100 is medium, first leg circuit Lge1 and second leg circuit Lgp1, Lgp2 are enabled. At this moment, energy utilization efficiency of propulsion system is lower than 96%, which indicates quite lower energy utilization efficiency.

However, in an embodiment of the invention, when positive demanded power of propulsion system 100 is medium, first leg circuit Lge1 and second leg circuit Lgp1 are enabled while second leg circuit Lgp2 are disabled. At this moment, energy utilization efficiency of propulsion system is higher than 96%, which indicates quite higher energy utilization efficiency (i.e. higher than the existing art).

Energy management strategy of an embodiment of the invention remarkably improves energy utilization efficiency of vehicles (such as electric vehicle or hybrid electric vehicle), so as to reduce energy loss of vehicles and increase driving distance, which is the quite beneficial technical efficiency.

Moreover, the strategy can disable part first leg circuit and (or) part of second leg circuit, which reduce the heat generated by first electricity transformer 300 and (or) second electricity transformer 400 under operation, so as to solve the bottleneck of heat.

Although introductions have been made for embodiments of the invention based on modes of execution, technicians in this field can understand that there are many modifications and varieties can be implemented in this invention. Thus, it is realized that intention of the Claim is to cover all the modifications and varieties within real conception and scope of this invention.

What is claimed is:

1. An energy management system, comprising:
   a first power converter coupled to a traction drive device and an energy-type energy source, the first power converter comprising a first leg circuit;
   a second power converter coupled to the traction drive device and a power-type energy source, the second power converter comprising a plurality of second leg circuits; and
   a control device configured to control the first power converter and the second power converter when the traction drive device is in a motoring mode by:
      enabling the first leg circuit and disabling all of the second leg circuits such that the energy-type energy source provides power to the traction drive device when a positive required power of the traction drive device is less than or equal to a positive threshold power; and
      enabling the first leg circuit and enabling at least one of the second leg circuits such that both the energy-type energy source and power-type energy source provide power to the traction drive device when the positive required power is greater than the positive threshold power.

2. The energy management system of claim 1, wherein the control device is further configured to control the first power converter and the second power converter when the traction drive device is in a regenerating mode by:
   enabling the first leg circuit and disabling all of the second leg circuits such that the traction drive device provides power to charge the energy-type energy source when a negative required power of the traction drive device is greater than a negative threshold power; and
   enabling the first leg circuit and enabling at least one of the second leg circuits such that the traction drive device provides power to charge both the energy-type energy source and the power-type energy source when the negative required power is less than or equal to the negative threshold power.

3. The energy management system of claim 1, wherein the second power converter comprises two second leg circuits.

4. The energy management system claim 3, wherein the positive threshold power comprises a first positive threshold power and a second positive threshold power, and the control device is further configured to control the first power converter and second power converter by:
   enabling the first leg circuit and disabling both of the second leg circuits when the positive required power is less than or equal to the first positive threshold power;
   enabling the first leg circuit and one of the second leg circuits when the positive required power is greater than the first positive threshold power and less than or equal to the second positive threshold power; and
   enabling the first leg circuit and both of the second leg circuits when the positive required power is greater than the second positive threshold power.

5. The energy management system of claim 2, wherein the second power converter comprises two second leg circuits.

6. The energy management system of claim 5, wherein the negative threshold power comprises a first negative threshold power and a second negative threshold power, and the control device is further configured to control the first power converter and second power converter by:

enabling the first leg circuit and disabling both of the second leg circuits when the negative required power is greater than the first negative threshold power;

enabling the first leg circuit and one of the second leg circuits when the negative required power is greater than the second negative threshold power and less than or equal to the first negative threshold power; and enabling the first leg circuit and both of the second leg circuits when the negative required power is less than or equal to the second negative threshold power.

7. The energy management system of claim 1, wherein the first power converter further comprises a first inductor, the second power converter comprises two second leg circuits, and a second inductor, and a third inductor, wherein:

each leg circuit comprises two switches connected in series between two poles of the traction drive device;

a first terminal of the first inductor is coupled to the energy-type energy source, a second terminal of the first inductor is coupled to a connection point of the two switches of the first leg circuit;

a first terminal of the second inductor is coupled to the power-type energy source, a second terminal of the second inductor is coupled to a connection point of the two switches of one of the second leg circuits; and a first terminal of the third inductor is coupled to the power-type energy source, a second terminal of the third inductor is coupled to a connection point of the two switches of the other of the second leg circuits.

8. The energy management system of claim 2, further comprising a pair of direct current (DC) links, wherein: the first power converter is coupled to the traction drive device via one of the DC links, the second power converter is coupled to the traction drive device via the other of the DC links; and the control device is further configured to determine the positive required power and the negative required power according to a command voltage of the DC links and a measured voltage of the DC links.

9. The energy management system of claim 8, wherein the control device is further configured to: estimate an estimated load power of the traction drive device; and determine the positive required power and the negative required power according to the estimated load power.

10. An energy management method, comprising:

coupling a first power converter and a second power converter to a traction drive device, the first power converter comprising a first leg circuit and the second power converter comprising a plurality of second leg circuits;

coupling the first leg circuit to an energy-type energy source;

coupling the plurality of second leg circuits to a power-type energy source;

controlling the first power converter and the second power converter when the traction drive device is in a motoring mode by:

enabling the first leg circuit and disabling all of the second leg circuits such that the energy-type energy source provides power to the traction drive device when a positive required power of the traction drive device is less than or equal to a positive threshold power; and enabling the first leg circuit and enabling at least one of the second leg circuits such that both the energy-type energy source and power-type energy source provide power to the traction drive device when the positive required power is greater than the positive threshold power.

11. The energy management method of claim 10, further comprising:

controlling the first power converter and the second power converter when the traction drive device is in a regenerating mode by:

enabling the first leg circuit and disabling all of the second leg circuits such that the traction drive device provides power to charge the energy-type energy source when a negative required power of the traction drive device is greater than a negative threshold power; and enabling the first leg circuit and enabling at least one of the second leg circuits such that the traction drive device provides power to charge both the energy-type energy source and the power-type energy source when the negative required power is less than or equal to the negative threshold power.

12. The energy management method of claim 10, wherein the second power converter comprises two second leg circuits.

13. The energy management method of claim 12, wherein the positive threshold power comprises a first positive threshold power and a second positive threshold power, and the energy management method further comprises controlling the first power converter and second power converter by:

enabling the first leg circuit and disabling both of the second leg circuits when the positive required power is less than or equal to the first positive threshold power;

enabling the first leg circuit and one of the second leg circuits when the positive required power is greater than the first positive threshold power and less than or equal to the second positive threshold power; and enabling the first leg circuit and both of the second leg circuits when the positive required power is greater than the second positive threshold power.

14. The energy management method of claim 11, wherein the second power converter comprises two second leg circuits.

15. The energy management method of claim 14, wherein the positive threshold power comprises a first negative threshold power and a second negative threshold power, and the energy management method further comprises controlling the first power converter and second power converter by:

enabling the first leg circuit and disabling both of the second leg circuits when the negative required power is greater than the first negative threshold power;

enabling the first leg circuit and one of the second leg circuits when the negative required power is greater than the second negative threshold power and less than or equal to the first negative threshold power; and enabling the first leg circuit and both of the second leg circuits when the negative required power is less than or equal to the second negative threshold power.

16. The energy management method of claim 10, further comprising determining the positive required power and the negative required power according to a command voltage of the traction drive device and a measured voltage of the traction drive device.

17. The energy management method of claim 16, wherein determining the positive required power and the negative required power comprises: estimating an estimated load power of the traction drive device and determining the positive required power and the negative required power according to the estimated load power.

18. An energy management system, comprising:
- an energy-type energy source;
- a power-type energy source;
- a power converter coupled to a traction drive device, the power converter comprising a first leg circuit coupled to the energy-type energy source and two second leg circuits coupled to the power-type energy source; and
- a control device configured to control the power converter when the traction drive device is in a motoring mode by:
  - enabling the first leg circuit and disabling both of the second leg circuits when the positive required power is less than or equal to the first positive threshold power;
  - enabling the first leg circuit and one of the second leg circuits when the positive required power is greater than the first positive threshold power and less than or equal to the second positive threshold power; and
  - enabling the first leg circuit and both of the second leg circuits when the positive required power is greater than the second positive threshold power.

19. The energy management system of claim 18, wherein the control device is further configured to control the power converter when the traction drive device is in a regenerating mode by:
- enabling the first leg circuit and disabling both of the second leg circuits when the negative required power is greater than the first negative threshold power;
- enabling the first leg circuit and one of the second leg circuits when the negative required power is greater than the second negative threshold power and less than or equal to the first negative threshold power; and
- enabling the first leg circuit and both of the second leg circuits when the negative required power is less than or equal to the second negative threshold power.

\* \* \* \* \*